United States Patent
Ogata et al.

(10) Patent No.: US 10,892,457 B2
(45) Date of Patent: Jan. 12, 2021

(54) METHOD OF PRODUCING LAMINATED SEPARATOR FOR NONAQUEOUS ELECTROLYTE SECONDARY BATTERY

(71) Applicant: Sumitomo Chemical Company, Limited, Tokyo (JP)

(72) Inventors: Toshihiko Ogata, Osaka (JP); Chikara Murakami, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 43 days.

(21) Appl. No.: 16/435,614

(22) Filed: Jun. 10, 2019

(65) Prior Publication Data
US 2019/0296307 A1  Sep. 26, 2019

Related U.S. Application Data

(62) Division of application No. 15/336,121, filed on Oct. 27, 2016, now abandoned.

(30) Foreign Application Priority Data

Oct. 29, 2015 (JP) ................................. 2015-213354
Feb. 10, 2016 (JP) ................................. 2016-024164

(51) Int. Cl.
| | |
|---|---|
| H01M 2/16 | (2006.01) |
| B32B 3/26 | (2006.01) |
| B32B 7/12 | (2006.01) |
| B32B 15/082 | (2006.01) |
| B32B 15/085 | (2006.01) |
| B32B 15/18 | (2006.01) |
| B32B 15/20 | (2006.01) |
| B32B 27/08 | (2006.01) |
| B32B 27/20 | (2006.01) |
| B32B 27/28 | (2006.01) |
| B32B 27/30 | (2006.01) |
| B32B 27/32 | (2006.01) |
| H01M 2/18 | (2006.01) |
| H01M 10/42 | (2006.01) |
| H01M 2/14 | (2006.01) |
| H01M 10/0525 | (2010.01) |

(52) U.S. Cl.
CPC .......... *H01M 2/1686* (2013.01); *B32B 3/266* (2013.01); *B32B 7/12* (2013.01); *B32B 15/082* (2013.01); *B32B 15/085* (2013.01); *B32B 15/18* (2013.01); *B32B 15/20* (2013.01); *B32B 27/08* (2013.01); *B32B 27/20* (2013.01); *B32B 27/285* (2013.01); *B32B 27/302* (2013.01); *B32B 27/304* (2013.01); *B32B 27/308* (2013.01); *B32B 27/32* (2013.01); *H01M 2/162* (2013.01); *B32B 2250/03* (2013.01); *B32B 2250/04* (2013.01); *B32B 2255/10* (2013.01); *B32B 2255/26* (2013.01); *B32B 2264/025* (2013.01); *B32B 2264/0214* (2013.01); *B32B 2264/0235* (2013.01); *B32B 2264/0271* (2013.01); *B32B 2264/0278* (2013.01); *B32B 2264/102* (2013.01); *B32B 2264/104* (2013.01); *B32B 2264/12* (2013.01); *B32B 2307/306* (2013.01); *B32B 2307/3065* (2013.01); *B32B 2307/406* (2013.01); *B32B 2307/416* (2013.01); *B32B 2307/50* (2013.01); *B32B 2307/718* (2013.01); *B32B 2307/72* (2013.01); *B32B 2307/724* (2013.01); *B32B 2307/726* (2013.01); *B32B 2307/732* (2013.01); *B32B 2457/10* (2013.01); *H01M 2/145* (2013.01); *H01M 2/166* (2013.01); *H01M 2/18* (2013.01); *H01M 10/0525* (2013.01); *H01M 10/4235* (2013.01); *H01M 2220/30* (2013.01)

(58) Field of Classification Search
None
See application file for complete search history.

(56) References Cited

U.S. PATENT DOCUMENTS

| | | |
|---|---|---|
| 2011/0212362 A1 | 9/2011 | Miyamori et al. |
| 2013/0089772 A1 | 4/2013 | Nishikawa |
| 2014/0255754 A1 | 9/2014 | Nishikawa et al. |
| 2015/0236323 A1 | 8/2015 | Honda et al. |
| 2015/0255768 A1 | 9/2015 | Konishi et al. |

FOREIGN PATENT DOCUMENTS

| | | |
|---|---|---|
| CN | 103857733 A | 6/2014 |
| JP | 2005294216 A | 10/2005 |
| JP | 2008210782 A | 9/2008 |
| JP | 2011068883 A | 4/2011 |
| JP | 2014011042 A | 1/2014 |
| JP | 2014017264 A | 1/2014 |

(Continued)

OTHER PUBLICATIONS

Office Action dated Aug. 12, 2016 in KR Application No. 10-2016-0077244.

(Continued)

*Primary Examiner* — Yoshitoshi Takeuchi
(74) *Attorney, Agent, or Firm* — Panitch Schwarze Belisario & Nadel LLP

(57) ABSTRACT

A laminated separator for a nonaqueous electrolyte secondary battery, (i) includes a porous film and a porous layer containing a polyvinylidene fluoride-based resin and (ii) has an excellent rate characteristic. The laminated separator includes the porous film containing a polyolefin-based resin as a main component and the porous layer containing the polyvinylidene fluoride-based resin, in which a surface of the porous layer has a 60-degree specular gloss of 3% to 26%.

4 Claims, No Drawings

(56) References Cited

FOREIGN PATENT DOCUMENTS

| | | |
|---|---|---|
| JP | 2014077127 A | 5/2014 |
| KR | 1020110098669 A | 9/2011 |
| KR | 20130031318 A | 3/2013 |
| KR | 1020140081807 A | 7/2014 |
| KR | 20140114428 A | 9/2014 |
| KR | 20150063119 A | 6/2015 |

OTHER PUBLICATIONS

Office Action dated Mar. 16, 2017 in KR Application No. 10-2016-0077244.
Office Action dated Nov. 8, 2017 in KR Application No. 10-2016-0077244.
Office Action dated Aug. 30, 2016 in JP Application No. 2016024164, partial English translation.
Office Action dated Aug. 30, 2018 in U.S. Appl. No. 15/336,121 by Ogata.
Office Action dated Feb. 11, 2019 in U.S. Appl. No. 15/336,121 by Ogata.

METHOD OF PRODUCING LAMINATED SEPARATOR FOR NONAQUEOUS ELECTROLYTE SECONDARY BATTERY

CROSS-REFERENCE TO RELATED APPLICATION

This application is a Divisional of co-pending U.S. patent application Ser. No. 15/336,121 filed Oct. 27, 2016, which claims priority under 35 U.S.C. § 119(b) to Japanese Application Nos. 2015-213354 filed Oct. 29, 2015 and 2016-024164 filed Feb. 10, 2016, the disclosures of which are incorporated herein by reference in their entirety.

TECHNICAL FIELD

The present invention relates to a laminated separator for a nonaqueous electrolyte secondary battery, a nonaqueous electrolyte secondary battery member, and the nonaqueous electrolyte secondary battery.

BACKGROUND ART

Nonaqueous electrolyte secondary batteries such as a lithium secondary battery are currently in wide use as batteries for devices such as a personal computer, a mobile telephone, and a portable information terminal.

A nonaqueous electrolyte secondary battery, typified by a lithium secondary battery, has a high energy density and may thus let a large current flow and generate heat in a case where a breakage in the battery or in the device using the battery has caused an internal or external short circuit. This risk has created a demand that a nonaqueous electrolyte secondary battery should prevent more than a certain level of heat generation to ensure a high level of safety.

Safety of a nonaqueous electrolyte secondary battery is typically ensured by imparting to the nonaqueous electrolyte secondary battery a shutdown function, that is, a function of, in a case where there has been abnormal heat generation, preventing passage of ions between the cathode and the anode with use of a separator to prevent further heat generation. More specifically, a nonaqueous electrolyte secondary battery typically includes, between the cathode and the anode, a separator that has a function of, in a case where, for example, an internal short circuit between the cathode and the anode has caused an abnormal current to flow through the battery, preventing that current and preventing (shutting down) the flow of an excessively large current for prevention of further heat generation. The separator is typically made of a filmy porous film whose main component is, for example, a polyolefin-based resin which melts at approximately 80° C. to 180° C. when abnormal heat generation occurs.

There has been known a technique of laminating a porous layer on at least one surface of a porous film in order to improve a function of a separator made of the porous film. For example, Patent Literature 1 discloses that, in order to prevent an internal short circuit of a battery, a porous film containing an inorganic filler and a film binding agent is laminated on a separator which is a microporous sheet mad of a polyolefin-based resin. A porous film which is thin, uniform, and excellent in flexibility is realized by defining an 85-degree specular gloss of the porous film.

Patent Literature 2 discloses a technique in which a 60-degree specular gloss is defined with respect to a separator which is obtained by applying, to a polyethylene microporous film, a composition containing insulating fine particles and an organic binder, in order to prevent a short circuit and improve reliability.

CITATION LIST

Patent Literatures

Patent Literature 1
Japanese Patent Application Publication, Tokukai, No. 2005-294216 (Publication Date: Oct. 20, 2005)
Patent Literature 2
Japanese Patent Application Publication, Tokukai, No. 2014-17264 (Publication Date: Jan. 30, 2014)

SUMMARY OF INVENTION

Technical Problem

In recent years, in order to improve adhesiveness between a separator and an electrode, there has been developed a separator in which a porous layer containing a polyvinylidene fluoride-based resin is laminated on at least one surface of a porous film containing a polyolefin as a main component. Further, it has been an issue how to reduce resistance in a nonaqueous electrolyte secondary battery, and accordingly, it is also expected that a rate characteristic is improved in a laminated separator for a nonaqueous electrolyte secondary battery which laminated separator includes a porous film and a porous layer containing a polyvinylidene fluoride-based resin.

Patent Literatures 1 and 2 each have objects of improving flexibility, preventing a short, circuit, and improving reliability, and do not take rate characteristic into consideration. Further, a porous layer disclosed in each of Patent Literatures 1 and 2 does not contain a polyvinylidene fluoride-based resin. Accordingly, there is a problem that the techniques disclosed in Patent Literatures 1 and 2 cannot improve a rate characteristic of a separator including a porous film and a porous layer containing a polyvinylidene fluoride-based resin.

The present invention has been accomplished in view of the problem, and an object of the present invention is to provide a laminated separator for a nonaqueous electrolyte secondary battery which laminated separator includes a porous film and a porous layer containing a polyvinylidene fluoride-based resin and has an excellent rate characteristic.

Solution to Problem

The inventors of the present invention have focused for the first time on a fact that a 60-degree specular gloss of a porous layer of a laminated separator for a nonaqueous electrolyte secondary battery relates to a rate characteristic of a nonaqueous electrolyte secondary battery including the laminated separator. The inventors of the present invention have completed the present invention by finding that it is possible to improve the rate characteristic of the nonaqueous electrolyte secondary battery by adjusting the 60-degree specular gloss of the porous layer to fall within a predetermined range.

In order to attain the object, a laminated separator, in accordance with an embodiment of the present invention, for a nonaqueous electrolyte secondary battery is a laminated separator for a nonaqueous electrolyte secondary battery, including: a porous film containing a polyolefin-based resin as a main component; and a porous layer containing a polyvinylidene fluoride-based resin, a surface of the porous layer having a 60-degree specular gloss of 3% to 26%.

The laminated separator in accordance with an embodiment of the present invention is preferably configured such that the porous layer contains a filler at a proportion of 1% by mass to 30% by mass with respect to a total amount of the polyvinylidene fluoride-based resin and the filler.

The laminated separator in accordance with an embodiment of the present invention is preferably configured such that the porous film has piercing strength of not less than 2 N.

The laminated separator in accordance with an embodiment of the present invention is preferably configured such that the porous film has an average pore diameter of not more than 0.14 μm.

The laminated separator in accordance with an embodiment of the present invention is preferably configured such that the polyvinylidene fluoride-based resin is (i) a copolymer of vinylidene fluoride and at least one monomer selected from a group consisting of hexafluoropropylene, tetrafluoroethylene, trifluoroethylene, trichloroethylene, and vinyl fluoride, (ii) a homopolymer of vinylidene fluoride, or (iii) a mixture thereof.

A nonaqueous electrolyte secondary battery member in accordance with an embodiment of the present invention includes: a cathode; a laminated separator recited in claim 1; and an anode, the cathode, the laminated separator, and the anode being disposed in this order.

A nonaqueous electrolyte secondary battery including the laminated separator.

Advantageous Effects of Invention

The present invention brings about an effect of improving a rate characteristic of a nonaqueous electrolyte secondary battery.

DESCRIPTION OF EMBODIMENTS

The description below deals with an embodiment of the present invention. The present invention is, however, not limited to such an embodiment. Further, the present invention is not limited to the description of the arrangements below, but may be altered in various ways by a skilled person within the scope of the claims. Any embodiment based on a proper combination of technical means disclosed in different embodiments is also encompassed in the technical scope of the present invention. In the Description, any numerical range expressed as "A to B" means "not less than A and not greater than B" unless otherwise stated.

[1. Laminated Separator for Nonaqueous Electrolyte Secondary Battery]

A laminated separator, in accordance with an embodiment of the present invention, for a nonaqueous electrolyte secondary battery is provided between a cathode and an anode in the nonaqueous electrolyte secondary battery and includes (i) a filmy porous film containing a polyolefin-based resin as a main component and (ii) a porous layer which is laminated on at least one surface of the porous film and contains a polyvinylidene fluoride-based resin (PVDF-based resin).

[1-1. Porous Film]

The porous film only needs to be a porous and filmy base material (i.e., a polyolefin-based porous base material) containing a polyolefin-based resin as a main component. That is, the porous film is a film that (i) has therein pores connected to one another and (ii) allows gas or a liquid to pass therethrough from one surface to the other surface. In other words, the porous film in accordance with an embodiment of the present invention is a film having pores and differs from a nonwoven fabric in which fibers are piled up on one another.

The porous film can be arranged such that in a case where the nonaqueous electrolyte secondary battery generates heat, the porous film is melted so as to render the laminated separator non-porous. Thus, the porous film can provide a shutdown function to the laminated separator. The porous film can be made of a single layer or a plurality of layers.

The porous film has a volume-based porosity of preferably 0.2 to 0.8 (20% by volume to 80% by volume), and more preferably 0.3 to 0.75 (30% by volume to 75% by volume), in order to allow the separator to (i) retain a larger amount of electrolyte solution and (ii) achieve a function of reliably preventing (shutting down) the flow of an excessively large current at a lower temperature. The porous film has pores each having an average diameter (an average pore diameter) of preferably not more than 0.14 μm, more preferably not more than 0.1 μm, and preferably not less than 0.01 μm, in order to, in a case where the porous film is used as a separator, achieve sufficient ion permeability and prevent particles from entering the cathode and/or the anode.

The average pore diameter of the porous film is controlled through, for example, a method of, in a case of reducing the pore diameter, (i) uniformizing the dispersion state of a pore forming agent such as an inorganic filler or of a phase separating agent during production of the porous film, (ii) using, as a pore forming agent, an inorganic filler having smaller particle sizes, (iii) drawing the porous film in a state where the porous film contains a phase separating agent, or (iv) drawing the porous film at a low extension magnification. The porosity of the porous film is controlled through, for example, a method of, in a case of producing a porous film having a high porosity, (i) increasing the amount of a pore forming agent such as an inorganic filler or of a phase separating agent relative to the polyolefin-based resin, (ii) drawing the porous film after the phase separating agent has been removed, or (iii) drawing the porous film at a high extension magnification.

A decrease in the average pore diameter of the porous film should increase a capillary force, which is presumed to serve as a driving force for introducing the electrolyte solution into pores inside the polyolefin base material. Furthermore, a smaller average pore diameter can subdue generation of dendrites of lithium metal.

Further, an increase in the porosity of the porous film should decrease the volume of a portion of the polyolefin base material which portion contains a polyolefin that cannot be permeated by the electrolyte solution.

The porous film has a piercing strength of preferably not less than 2N, and more preferably not less than 3N. The porous film having excessively small piercing strength may allow cathode active material particles and anode active material particles to pierce the separator so that a short circuit occurs between the cathode and the anode, for example, in a case where (i) an operation of stacking the cathode, the anode, and the separator and then rolling up the stack thus obtained is carried out in a battery assembly process, (ii) an operation of pressing the stack thus rolled up is carried out in the battery assembly process, or (iii) an external pressure is applied to the battery. The porous film has piercing strength of preferably not more than 10N, and more preferably not more than 8N.

It is essential that the porous film contains a polyolefin-based resin component at a proportion of not less than 50% by volume with respect to whole components contained in the porous film. Such a proportion of the polyolefin-based resin component is preferably not less than 90% by volume, and more preferably not less than 95% by volume. The porous film preferably contains, as the poly olefin-based resin component, a high molecular weight component having a weight-average molecular weight of $5 \times 10^5$ to $15 \times 10^6$. The porous film particularly preferably contains, as the polyolefin-based resin component, a polyolefin-based resin component having a weight-average molecular weight of 1,000,000 or more. This is because that a whole of the porous film achieves higher strength.

Examples of the polyolefin-based resin include high molecular weight homopolymers or copolymers produced through polymerization of ethylene, propylene, 1-butene, 4-methyl-1-pentene, 1-hexene, and/or the like. The porous film can be a layer containing only one of these polyolefins and/or a layer containing two or more of these polyolefins. Among these, a high molecular weight polyethylene containing ethylene as a main component is particularly preferable. Note that the porous film can contain another component which is not a polyolefin, as long as the another component does not impair the function of the layer.

The porous film has an air permeability normally in a range of 30 sec/100 cc to 500 sec/100 cc, and preferably in a range of 50 sec/100 cc to 300 sec/100 cc, in terms of Gurley values. A porous film having an air permeability within such a range achieves sufficient ion permeability in a case where the porous film is used in the separator.

A thickness of the porous film is determined as appropriate in view of the number of layers in the laminated separator. Particularly, since the porous layer is formed on one surface (or both surfaces) of the porous film, the porous film has a thickness of preferably 4 μm to 40 μm, and more preferably a thickness of 7 μm to 30 μm. The porous film has a weight per unit area of normally 4 $g/m^2$ to 20 $g/m^2$, and preferably 5 $g/m^2$ to 12 $g/m^2$. This is because that a porous film having such a weight per unit area enables to provide suitable strength, thickness, handling easiness, and weight and is also possible to enhance a weight energy density and/or a volume energy density of the nonaqueous electrolyte secondary battery in a case where the porous film is used in the separator of the nonaqueous electrolyte secondary battery.

The porous film may be produced through any publicly-known technique, and is not particularly limited to any specific method. For example, as disclosed in Japanese Patent Application Publication, Tokukaihei, No. 7-29563 A (1995), the porous film may be produced through a method of (i) adding a pore forming agent to a thermoplastic resin to shape the thermoplastic resin into a film and then (ii) removing the pore forming agent with use of an appropriate solvent.

Specifically, in a case of, for example, producing a porous film with use of a polyolefin resin containing (i) an ultra high molecular weight polyethylene and (ii) a low molecular weight polyolefin having a weight-average molecular weight of 10,000 or less, such a porous film is, in terms of production cost, preferably produced through the method including the steps of:

(1) kneading (i) 100 parts by weight of the ultra high molecular weight polyethylene, (ii) 5 parts by weight to 200 parts by weight of the low molecular weight polyolefin having a weight-average molecular weight of 10,000 or less, and (iii) 100 parts by weight to 400 parts by weight of an inorganic filler such as calcium carbonate to produce a polyolefin resin composition;

(2) shaping the polyolefin resin composition into a sheet;

(3) removing the inorganic filler from the sheet produced in the step (2); and (4) drawing the sheet produced in the step (3) so as to obtain an A layer (porous film).

Alternatively, it is possible to employ a method disclosed in each of the Patent Literatures described above.

Further, it is possible to employ a commercially available porous film having the characteristics described above.

[1-2. Porous Layer]

The porous layer in accordance with an embodiment of the present invention contains a polyvinylidene fluoride-based resin (PVDF-based resin). The porous layer can be a layer that (i) has therein many pores connected to one another and (ii) allows gas or a liquid to pass therethrough from one surface to the other surface. According to the present embodiment, the porous layer may be a layer which (i) is provided on one surface or both surfaces of the porous film as an outermost layer of the separator and (ii) can be adhered to an electrode.

The inventors of the present invention have diligently studied and found that in a case where a 60-degree specular gloss of a surface of the porous layer is 3% to 26%, it is possible to improve a rate characteristic of the nonaqueous electrolyte secondary battery including the laminated separator including the porous layer. Note that the 60-degree specular gloss of the porous layer indicates a gloss which is obtained in a case where an incident angle and a light-receiving angle of the porous layer are each 60° and the 60-degree specular gloss is measured by a method defined in JIS Z8741. A specular gloss of the porous layer is a parameter related to denseness, uniformity, and the like of the porous layer.

The specular gloss is based on an amount of reflected light. The porous layer has openings on a surface thereof. Accordingly, incident light for measuring the specular gloss of the porous layer enters an inside of the porous layer.

The light which has entered the inside of the porous layer is reflected (mirror-reflected or diffuse-reflected) or scattered on surfaces of the resin which surfaces constitute inner walls of holes inside the porous layer. The light thus reflected or scattered is partially emitted, as internally reflected light, from the surface of the porous layer to outside.

It has been known that an amount of light reflected inside a porous body is influenced by a size and shape of a void in the porous body (see Takehiro YAMADA, "Study for Characteristic of Microcellular Plastic", Saitama industrial Technology Center Research Report, Vol. 4 (2006); and National Institute of Information and Communications Technology, "Research and development of new reflective plate for cost reduction of liquid crystal display device", Research and development result report for FY 2006 (April 2007)).

Accordingly, a person skilled in the art will be able to sufficiently understand, based on the Description, that the specular gloss reflects a state of an entire inside of the separator.

In a case where the porous layer has a 60-degree specular gloss of less than 3%, the porous layer has low uniformity, and thus has non-uniform ion permeability. Accordingly, a part of the porous layer which part has low ion permeability becomes a rate-limiting factor and reduces efficient transportation of ions in a whole of the porous layer, which leads to a deterioration in rate characteristic. Accordingly, in a case where the porous layer has a 60-degree specular gloss of not less than 3%, it is possible to suppress a deterioration in rate characteristic caused by non-uniformity of the porous layer and thus obtain an excellent rate characteristic.

Meanwhile, in a case where the porous layer has a 60-degree specular gloss of more than 26%, the porous layer has an excessively high denseness, and thus the pores are blocked by an insoluble byproduct and/or air bubbles caused by charge and discharge. This may cause a deterioration in ion permeability of the separator. Further, there is less space for an electrolyte solution to be retained at an interface between the porous layer and the electrode, and this leads to a decrease in amount of the electrolyte solution retained at the interface between the porous layer and the electrode. Accordingly, Li ions are more likely to be dried up at the interface in a case where the battery is operated under a large current, which leads to a deterioration in rate characteristic. Accordingly, the porous layer having a 60-degree specular gloss specular gloss of not more than 26% can suppress a deterioration in rate characteristic caused by (i) the deterioration in ion permeability of the separator and/or (ii) the drying up of the electrolyte solution at the interface between the porous layer and the electrode, and thus provide an excellent rate characteristic.

A lower limit of the 60-degree specular gloss of the surface of the porous layer is preferably not less than 4%, and more preferably not less than 5%. That is, the porous layer has a 60-degree specular gloss of preferably not less than 4% and not more than 26%, and more preferably not less than 5% and not more than 26%. Further, an upper limit of the 60-degree specular gloss of the surface of the porous layer is preferably not more than 22%, and more preferably not more than 18%.

It is preferable that the resin constituting the porous layer contains polyvinylidene fluoride-based resin and has a structure in which skeletons with a diameter of not more than 1 µm are connected with each other to form a three-dimensional network.

Examples of the polyvinylidene fluoride-based resin include homopolymers of vinylidene fluoride (i.e., polyvinylidene fluoride); and copolymers (e.g., polyvinylidene fluoride copolymer) of vinylidene fluoride and other monomer(s) polymerizable with vinylidene fluoride. The polyvinylidene fluoride-based resin contained in the porous layer is preferably a homopolymer of vinylidene fluoride, a vinylidene fluoride copolymer, or a mixture of these polymers. Examples of the monomer polymerizable with vinylidene fluoride include hexafluoropropylene, tetrafluoroethylene, trifluoroethylene, trichloroethylene, and vinyl fluoride. That is, the polyvinylidene fluoride copolymer is preferably a copolymer of vinylidene fluoride and at least one monomer selected from a group consisting of hexafluoropropylene, tetrafluoroethylene, trifluoroethylene, trichloroethylene, and vinyl fluoride. The polyvinylidene fluoride-based resin can be synthesized through emulsion polymerization or suspension polymerization.

The polyvinylidene fluoride-based resin preferably contains vinylidene fluoride at a proportion of not less than 85 mol %. The polyvinylidene fluoride-based resin contains vinylidene fluoride at a proportion of more preferably not less than 90 mol %, even more preferably not less than 95 mol %, and still more preferably not less than 98 mol %. A polyvinylidene fluoride-based resin containing vinylidene fluoride at a proportion of not less than 85 mol % is more likely to allow the porous layer to achieve a mechanical strength and a heat resistance against a pressure or heat occurred in battery production.

The porous layer preferably contains two kinds of polyvinylidene fluoride-based resins (a first resin and a second resin below) that are different from each other in a content of hexafluoropropylene.

The first resin is (i) a vinylidene fluoride-hexafluoropropylene copolymer containing hexafluoropropylene at a proportion of more than 0 mol % and not more than 1.5 mol % or (ii) a vinylidene fluoride homopolymer (containing hexafluoropropylene at a proportion of 0 mol %).

The second resin is a vinylidene fluoride-hexafluoropropylene copolymer containing hexafluoropropylene at a proportion of more than 1.5 mol %.

The porous layer containing the two kinds of polyvinylidene fluoride-based resins is adhered to the electrode more favorably, as compared with a porous layer not containing one of the two kinds of polyvinylidene fluoride-based resins. Further, the porous layer containing the two kinds of polyvinylidene fluoride-based resins has improved adhesiveness to the porous film and greater force is required in order to peel the porous layer from the porous film, as compared with a porous layer not containing one of the two kinds of polyvinylidene fluoride-based resins. The first resin and the second resin are preferably mixed at a mixing ratio (mass ratio, first resin:second resin) of 15:85 to 85:15.

The polyvinylidene fluoride-based resin has a weight-average molecular weight of preferably 300,000 to 3,000,000. A polyvinylidene fluoride-based resin having a weight-average molecular weight of 300,000 or more allows the porous layer to attain a mechanical property with which the porous layer can endure, a process for adhering the porous layer to the electrode, thereby allowing the porous layer and the electrode to adhere to each other sufficiently. Meanwhile, a polyvinylidene fluoride-based resin having a weight-average molecular weight of 3,000,000 or less does not cause a coating solution, which is to be applied in order to shape the porous layer, to have a too high viscosity, which allows the coating solution to have excellent shaping easiness. The weight-average molecular weight of the polyvinylidene fluoride-based resin is more preferably 300,000 to 2,000,000, and further preferably 500,000 to 1,500,000.

The polyvinylidene fluoride-based resin has a fibril diameter of preferably 10 nm to 1000 nm, in terms of the rate characteristic.

The porous layer may contain other resin which is not the polyvinylidene fluoride-based resin. Examples of the other resin include styrene-butadiene copolymer; homopolymers or copolymers of vinyl nitriles such as acrylonitrile and methacrylonitrile; and polyethers such as polyethylene oxide and polypropylene oxide.

Further, the porous layer may contain a filler made of inorganic matter or organic matter. A porous layer containing the filler can improve slidability and/or heat resistance of the separator. The filler may be an organic filler or an inorganic filler each of which is stable in a nonaqueous electrolyte solution and is electrochemically stable. The filler preferably has a heat-resistant temperature of not less than 150° C. to ensure safety of the battery.

Examples of the organic filler include crosslinked high molecule fine particles such as crosslinked polyacrylic acid, crosslinked polyacrylic acid ester, crosslinked polymethacrylic acid, crosslinked polymethacrylic acid ester, crosslinked polymethyl methacrylate, crosslinked polysilicone, crosslinked polystyrene, crosslinked polydivinyl benzene, a crosslinked product of a styrene-divinylbenzene copolymer, polyimide, a melamine resin, a phenol resin, a benzoguanamine-formaldehyde condensate; and heat-resistant high molecule fine particles such as polysulfone, polyacrylonitrile, polyaramid, polyacetal, and thermoplastic polyimide.

A resin (high molecule) contained in the organic filler may be a mixture, a modified product, a derivative, a copolymer (a random copolymer, an alternating copolymer, a block copolymer, or a graft copolymer), or a crosslinked product of any of the molecules listed above as examples.

Examples of the inorganic filler include metal hydroxides such as aluminum hydroxide, magnesium hydroxide, calcium hydroxide, chromium hydroxide, zirconium hydroxide, nickel hydroxide, and boron hydroxide; metal oxides such as alumina and zirconia; carbonates such as calcium carbonate and magnesium carbonate; sulfates such as barium sulfate and calcium sulfate; clay minerals such as calcium silicate and talc. Among these, the inorganic filler is preferably a metal hydroxide, in terms of achievement of fire retardance and/or electricity removal effects.

An embodiment of the present invention may use (i) only a single filler or (ii) two or more of fillers in combination.

The filler has a volume average particle size of preferably 0.01 µm to 10 µm, in order to ensure (i) fine adhesion and fine slidability and (ii) shaping easiness of the separator. A lower limit of the volume average particle size is more preferably not less than 0.1 µm, whereas an upper limit of the volume average particle size is more preferably not more than 5 µm.

The filler is constituted by particles of any shape, which may be a sphere, an ellipse, a plate-shape, a bar-shape, or an irregular shape. In order to prevent a short circuit in the battery, the particles are preferably (i) plate-shaped particles or (ii) primary particles which are not aggregated.

The filler forms fine bumps on a surface of the porous layer, thereby improving the slidability. A filler constituted by (i) plate-shaped particles or (ii) primary particles which are not aggregated forms finer bumps on the surface of the porous layer, so that the porous layer is adhered to the electrode more favorably.

The porous layer contains the polyvinylidene fluoride-based resin at a proportion of preferably not less than 80% by mass, more preferably not less than 90% by mass, and still more preferably not less than 95% by mass with respect to a total amount of a resin component which is contained in the porous layer and is not the filler.

The porous layer contains the filler at a proportion of preferably 1% by mass to 30% by mass and more preferably 3% by mass to 28% by mass with respect to a total amount of the polyvinylidene fluoride-based resin and the filler. A porous layer containing the filler at a proportion of not less than 1% by mass is likely to exhibit the effect of forming fine bumps on the surface of the porous layer so as to improve the slidability of the separator. From this viewpoint, the porous layer contains the filler more preferably at a proportion of not less than 3% by mass. Meanwhile, a porous layer containing the filler at a proportion of not more than 30% by mass allows the porous layer to maintain mechanical strength. With this arrangement, for example, during a process for producing an electrode body by rolling up a stack of the electrode and the separator, the separator is hardly cracked and/or the like. From this viewpoint, the porous layer contains the filler at a proportion of more preferably not more than 20% by mass, and further preferably not more than 10% by mass.

In order to prevent, in a process of slitting the separator, a suited surface of the separator from becoming fibrous, bending, and/or permitting intrusion of scraps occurred as a result of the slitting, the porous layer contains the filler at a proportion of preferably not less than 1% by mass, and more preferably not less than 3% by mass, with respect to a total amount of the polyvinylidene fluoride-based resin and the filler.

In order to ensure adhesion to the electrode and a high energy density, the porous layer has, on one surface of the porous film, an average thickness of preferably 0.5 µm to 10 µm, and more preferably 1 µm to 5 µm.

The porous layer is preferably made porous sufficiently, in terms of ion permeability. Specifically, the porous layer has a porosity of preferably 30% to 60%. The porous layer has an average pore size of preferably 20 nm to 100 nm.

The porous layer has a weight per unit area selected as appropriate in view of the strength, thickness, weight, and handling easiness of the laminated separator. The weight per unit area is, however, normally preferably 0.1 $g/m^2$ to 5 $g/m^2$, more preferably 0.5 $g/m^2$ to 3 $g/m^2$, in order to increase the weight energy density and volume energy density of a nonaqueous electrolyte secondary battery including the laminated separator.

A volume per unit area of the porous layer is preferably 0.1 $cm^3/m^2$ to 2.5 $cm^3/m^2$. In a case where the porous layer has (i) a volume per unit area which falls under the above range and (ii) a 60-degree specular gloss of 3% to 26%, it is possible to achieve a better rale characteristic. In a case where the volume per unit area of the porous layer is less than 0.1 $cm^3/m^2$, a rate characteristic may be deteriorated due to (i) blockage of pores with an insoluble byproduct and/or (ii) an insufficient function of retaining the electrolyte solution at the interface between the porous layer and the electrode. In a case where the volume per unit area of the porous layer exceeds 2.5 $cm^3/m^2$, ion permeability of the porous layer decreases, which leads to a low battery characteristic from the beginning.

The porous layer has a coefficient of kinetic friction of preferably 0.1 to 0.6, more preferably 0.1 to 0.4, and further preferably 0.1 to 0.3. The coefficient of kinetic friction is a value measured by a method according to JIS K7125. Specifically, a coefficient of kinetic friction in an embodiment of the present invention is a value measured by Surface Property Tester (available from Heidon).

[2. Production Method of Producing Laminated Separator for Nonaqueous Electrolyte Secondary Battery]

A method of producing a laminated separator, in accordance with an embodiment of the present invention, for a nonaqueous electrolyte secondary battery includes, for example, a method of (i) applying to a porous film a coating solution containing a polyvinylidene fluoride-based resin to form a coating layer and then (ii) curing the polyvinylidene fluoride-based resin in the coating layer to form a porous layer integrally on the porous film.

A porous layer containing a polyvinylidene fluoride-based resin may be formed through, for example, a wet coating method below. Forming a porous layer through such a method allows the porous layer to have a three-dimensional network structure. The coating solution can be prepared in such a manner that a polyvinylidene fluoride-based resin is dissolved in a solvent and a filler is dispersed in the solvent. This coating solution is applied to a porous film, and then the porous film with the coating solution applied is immersed in an appropriate setting liquid to induce phase separation and cure the polyvinylidene fluoride-based resin. Performing these steps forms, on the porous film, a layer containing a polyvinylidene fluoride-based resin and having a porous structure (preferably a three-dimensional network structure). This layer is then washed with water and dried to remove the setting liquid from the layer having a porous structure.

A specific example is the following method:

(a) Prepare a solution (coating solution) in which a polyvinylidene fluoride-based resin is dissolved in a solvent;

(b) Apply the coating solution to a porous film to form a coating layer;

(c) Perform an operation such as immersing, into a solvent (deposition solution) that does not dissolve the polyvinylidene fluoride-based resin, the coating layer to separate the polyvinylidene fluoride-based resin out of the coating layer;

(d) As necessary, immerse the wet coaling layer, in which the polyvinylidene fluoride-based resin has been separated, again into a solvent that does not dissolve the polyvinylidene fluoride-based resin, and wash the coating layer;

(e) Dry the wet coating layer, in which the polyvinylidene fluoride-based resin has been separated; and (f) Adjust a gloss of the coating layer, in which the polyvinylidene fluoride-based resin has been separated.

Suitable examples of the solvent (hereinafter referred to also as "good solvent") for use in the preparation of the coating solution which solvent dissolves a polyvinylidene fluoride-based resin include polar amide solvents such as N-methyl-2-pyrrolidone (NMP), dimethylacetamide, and dimethylformamide.

To form a good porous structure, the good solvent is preferably mixed with a phase separating agent for inducing phase separation. Examples of the phase separating agent include water, methanol, ethanol, propyl alcohol, butyl alcohol, butandiol, ethylene glycol, propylene glycol, and tripropylene glycol. The phase separating agent is preferably added in an amount that achieves viscosity suitable for the coating.

To form a good porous structure, the solvent to be used as the coating solution is preferably a mixed solvent containing (i) not less than 60% by mass of a good solvent and (ii) 5% by mass to 40% by mass of a phase separating agent. To form a good porous structure, the coating solution preferably contains a polyvinylidene fluoride-based resin at a concentration of 3% by mass to 10% by mass.

The coating solution my be applied to the porous film through a conventional coating method, for example, with use of a Meyer bar, a die coater, a reverse roll coater, or a gravure coater.

The deposition solution typically includes (i) a good solvent and phase separating agent for use in the preparation of the coating solution and (ii) water. It is preferable in terms of production that the good solvent and the phase separating agent be mixed at a ratio equal to that of the mixed solvent for use in the dissolution of the polyvinylidene fluoride-based resin. For good formation of a porous structure and productivity, the water concentration is preferably 40% by mass to 90% by mass.

The coating layer in which the polyvinylidene fluoride-based resin has been separated can be dried by a publicly known method.

Examples of the method of adjusting the gloss of the coating layer in which the polyvinylidene fluoride-based resin has been separated include a publicly known method such as (i) a chemical treatment involving an acid, an alkali, an organic solvent, or the like, (ii) a physical treatment of removing a surface of the coating layer by use of sandpaper or the like, (iii) a corona treatment, or (iv) a plasma treatment. Among the above treatments, the chemical treatment is preferable. Examples of the organic solvent to be used for the chemical treatment include ketone such as acetone; amide such as N-methyl-2-pyrrolidone (NMP), dimethylacetamide, and dimethylformamide; cyclic carbonate such as ethylene carbonate, propylene carbonate, fluoroethylene carbonate, and difluoroethylene carbonate; chain carbonate such as dimethyl carbonate, diethyl carbonate, ethyl methyl carbonate, and fluorine substituents thereof; and cyclic ester such as γ-butyrolactone and γ-valerolactone. Among the above organic solvents, it is preferable to carry out the treatment by using diethyl carbonate.

Note that the coating layer in which the polyvinylidene fluoride-based resin has been separated can be dried after the gloss of the coating layer is adjusted.

The separator in accordance with an embodiment of the present invention may alternatively be produced through a method of (i) preparing a porous layer as a separate sheet, (ii) placing the porous layer on a porous film, and (iii) combining the porous layer with the porous film through thermocompression or with use of an adhesive. The porous layer may be prepared as a separate sheet through a method of, for example, (i) applying to a release sheet a coating solution containing a polyvinylidene fluoride-based resin and a filler, (ii) forming a porous layer through the production method described above, and (iii) peeling the porous layer from the release sheet.

The laminated separator in accordance with an embodiment of the present invention has an air permeability of preferably 30 sec/100 mL to 800 sec/100 mL, and more preferably 50 sec/100 mL to 500 sec/100 mL, in terms of Gurley values. A laminated separator having such an air permeability achieves sufficient ion permeability. An air permeability larger than the above range means that the laminated separator has a high porosity and thus has a rough laminated structure. This may result in the laminated separator having decreased strength, in particular insufficient shape stability at high temperatures. An air permeability smaller than the above range, on the other hand, may prevent the laminated separator from having sufficient ion permeability when used as a separator and thus degrade the characteristics of a nonaqueous electrolyte secondary battery to be produced.

[3. Nonaqueous Electrolyte Secondary Battery]

A nonaqueous electrolyte secondary battery in accordance with an embodiment of the present invention achieves an electromotive force through doping and dedoping with lithium. The nonaqueous electrolyte secondary battery in accordance with an embodiment of the present invention only needs to include a laminated body (nonaqueous electrolyte secondary battery member) in which a cathode sheet, the above-described laminated separator, and an anode sheet are laminated in this order, and is not particularly limited in other arrangements. The nonaqueous electrolyte secondary battery includes (i) a battery element made of a structure (a) including the anode sheet and the cathode sheet facing each other via the above-described laminated separator and (b) containing the electrolyte solution and (ii) an exterior member including the battery element. The nonaqueous electrolyte secondary battery is particularly applicable to a lithium ion secondary battery. Note that the doping means storage, support, absorption, or insertion, and means a phenomenon in which lithium ions enter an active material of the electrode (e.g., the cathode).

The cathode sheet may be achieved as an active material layer which (i) is formed on a current collector and (ii) includes a cathode active material and a binder resin. The active material layer may further include a conductive auxiliary agent.

Examples of the cathode active material include a lithium-containing transition metal oxide, specific examples of which include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, and $LiAl_{1/4}Ni_{3/4}O_2$.

Examples of the binder resin include a polyvinylidene fluoride-based resin.

Examples of the conductive auxiliary agent include carbon materials such as acetylene black, Ketjenblack, and graphite powder.

Examples of the current collector include aluminum foil, titanium foil, and stainless steel foil each having a thickness of 5 µm to 20 µm.

The anode sheet may b achieved as an active material layer which (i) is formed on a current collector and (ii) includes an anode active material and a binder resin. The active material layer may further include a conductive auxiliary agent. Examples of the anode active material include a material capable of electrochemical storage of lithium. Specific examples of such a material include a carbon material; and an alloy of (i) lithium and (ii) silicon, tin, aluminum, or the like.

Examples of the binder resin include a polyvinylidene fluoride-based resin and styrene-butadiene rubber. The separator of an embodiment of the present invention is able to ensure sufficient adhesion to the anode even if the anode includes styrene-butadiene rubber as the anode binder.

Examples of the conductive auxiliary agent include carbon materials such as acetylene black, Ketjenblack, and graphite powder.

Examples of the current collector include copper foil, nickel foil, and stainless steel foil each having a thickness of 5 µm to 20 µm. Instead of the anode described above, metallic lithium foil may be employed as the anode.

The electrolyte solution is a solution made of a nonaqueous solvent in which a lithium salt is dissolved. Examples of the lithium salt include $LiPF_6$, $LiBF_4$, and $LiClO_4$.

Examples of the nonaqueous solvent include all solvents normally used in a nonaqueous electrolyte secondary battery. Examples of the nonaqueous solvent include cyclic carbonate such as ethylene carbonate, propylene carbonate, fluoroethylene carbonate, and difluoroethylene carbonate; chain carbonate such as dimethyl carbonate, diethyl carbonate, ethyl methyl carbonate, and fluorine substituents thereof; and cyclic ester such as γ-butyrolactone and γ-valerolactone. An embodiment of the present invention may use only (i) one kind of solvent or (ii) two or more kinds of solvents in combination selected from the above.

The electrolyte solution is preferably the one obtained by (i) preparing a solvent through mixing of cyclic carbonate and chain carbonate at a mass ratio (cyclic carbonate/chain carbonate) of 20/80 to 40/60 (more preferably, 30/70) and (ii) dissolving in the solvent a lithium salt at a concentration of 0.5M to 1.5M.

Examples of the exterior member include a metal can and a pack which is made of an aluminum-laminated film. Examples of the shape of the battery include a polygon, a cylinder, and a coin shape.

It is possible to produce the nonaqueous electrolyte secondary battery by, for example, (i) causing the electrolyte solution to permeate the laminated body including the cathode sheet, the anode sheet, and the above-described laminated separator which is disposed between the cathode sheet and the anode sheet, (ii) causing the laminated body to be accommodated in the exterior member (e.g., the pack made of the aluminum-laminated layer film), and (iii) pressing the laminated body via the exterior member. It is preferable to perform the pressing while the laminated separator and the electrode are heated (hot pressing) in order to further enhance adhesion between the electrode and the separator.

A manner how the separator is disposed between the cathode sheet and the anode sheet may be (i) a manner (so-called stack system) in which at least one cathode sheet, at least one separator, and at least one anode sheet are stacked in this order or (ii) a manner in which a cathode sheet, a separator, an anode sheet, and a separator are stacked in this order and the stack thus obtained is rolled up in a direction along a length of the stack.

EXAMPLES

The following description will discuss the present invention with reference to Examples, but the present invention is not limited to this.

<Measurement of Specular Gloss>

A specular gloss of a laminated separator for a nonaqueous electrolyte secondary battery was measured by use of a gloss meter (manufactured by NIPPON DENSHOKU INDUSTRIES Co., LTD.; PG-IIM type) in such a manner that (i) five sheets of KB paper (manufactured by KOKUYO Co., Ltd.; product No. KB-39N) were stacked on one another, (ii) the laminated separator whose specular gloss was to be measured was placed on top of the five sheets of KB paper, and (iii) the measurement was carried out with an incident angle and a light-receiving angle of a surface of a porous layer of the laminated separator each set to 60°.

Note that, if necessary, for example, in a case where a matter such as resin powder and an inorganic matter is adhered to a surface of the laminated separator, it is possible to carry out, before the measurement of the specular gloss, a pretreatment of the laminated separator, for example, by (i) immersing the laminated separator in an organic solvent such as diethyl carbonate (DEC) and/or water and washing off the matter thus adhered and then (ii) drying off the organic solvent and/or water.

<Measurement of Piercing Strength>

By use of a handy-type compression tester (KATO TECH CO., LTD.; model No. KES-G5), a porous film was fixed with a washer of 12 mmφ, and the porous film was pierced with a pin at 200 mm/min to measure a maximum stress (N), which was defined as piercing strength of the porous film. The pin used in the measurement had a pin diameter of 1 mmφ and a tip radius of 0.5 R.

<Measurement of Volume Per Unit Area of Porous Layer>

A weight per unit area (weight per 1 square meter) of the porous layer in a dried state was measured and the weight per unit area was divided by specific gravity of a PVDF-based resin at 25° C., so that a volume per unit area (volume per 1 square meter) of a resin component of the porous layer in a dried state was measured.

<Production of Separator>

Laminated separators, in accordance with Examples 1 through 6 and Comparative Examples 1 and 2, for a nonaqueous electrolyte secondary battery were produced as below.

EXAMPLE 1

A PVDF-based resin (manufactured by Arkema Inc.; product name "KYNAR2801") was stirred and dissolved in N-methyl-2-pyrrolidone at 65° C. for 30 minutes so that a solid content was 7% by mass. A resultant solution was applied as a coating solution to a polyethylene porous film (thickness 12 µm, porosity 44%, average pore diameter 0.035 µm) through a doctor blade method so that a volume per unit area of the PVDF-based resin in the coating solution was 0.56 cm$^3$/m$^2$. A laminated body (1-i), which was a material thus obtained by applying the coating solution to the polyethylene porous film, was immersed in 2-propanol while a coating layer remained wet with NMP, and then was allowed to stand at 25° C. (or 5 minutes, so that a laminated porous film (1-ii) was obtained. While the laminated porous film (1-ii) thus obtained was in an immersion solvent wet state, the laminated porous film (1-ii) was further immersed in another 2-propanol, and then was allowed to stand at 25° C. for 5 minutes, so that a laminated porous film (1-iii) was obtained. The laminated porous film (1-iii) thus obtained was dried at 65° C. for 5 minutes, so that a laminated porous film (1-iv) was obtained. The laminated porous film (1-iv) thus obtained was immersed in diethyl carbonate, and then was allowed to stand at 70° C. for 1 minute. The laminated porous film (1-iv) was taken out from diethyl carbonate and then was dried at room temperature, so that a laminated separator in accordance with Example 1 for a nonaqueous electrolyte secondary battery was obtained. Table 1 shows a rate characteristic of the laminated separator in accordance with Example 1.

EXAMPLE 2

The laminated porous film (1-iv) obtained in Example 1 was immersed in diethyl carbonate, and then was allowed to stand at 70° C. for 5 minutes. The laminated porous film (1-iv) was taken out from diethyl carbonate and then was dried at room temperature, so that a laminated separator in accordance with Example 2 for a nonaqueous electrolyte secondary battery was obtained. Table 1 shows a rate characteristic of the laminated separator in accordance with Example 2.

EXAMPLE 3

The laminated porous film (1-iv) obtained in Example 1 was immersed in diethyl carbonate, and then was allowed to stand at 70° C. for 15 minutes. The laminated porous film (1-iv) was taken out from diethyl carbonate and then was dried at room temperature, so that a laminated separator in accordance with Example 3 for a nonaqueous electrolyte secondary battery was obtained. Table 1 shows a rare characteristic of the laminated separator in accordance with Example 3.

EXAMPLE 4

The laminated porous film (1-iv) obtained in Example 1 was immersed in diethyl carbonate and then was allowed to stand at 70° C. for 30 minutes. The laminated porous film (1-iv) was taken out from diethyl carbonate and then was dried at room temperature, so that a laminated separator in accordance with Example 4 for a nonaqueous electrolyte secondary battery was obtained. Table 1 shows a rare characteristic of the laminated separator in accordance with Example 4.

EXAMPLE 5

A laminated separator in accordance with Example 5 for a nonaqueous electrolyte secondary battery was obtained by a method similar to that of Example 3, except that the coating solution was applied to the polyethylene porous film so that the volume per unit area of the PVDF-based resin in the coating solution was 1.58 cm$^3$/m$^2$. Table 1 shows a rate characteristic of the laminated separator in accordance with Example 5.

EXAMPLE 6

A laminated separator in accordance with Example 6 for a nonaqueous electrolyte secondary battery was obtained by a method similar to that of Example 3, except that the coating solution was applied to the polyethylene porous film so that the volume per unit area of the PVDF-based resin in the coating solution was 0.11 cm$^3$/m$^2$. Table 1 shows a rate characteristic of the laminated separator in accordance with Example 6.

COMPARATIVE EXAMPLE 1

A laminated separator in accordance with Comparative Example 1 for a nonaqueous electrolyte secondary battery was obtained by a method similar to that of Example 1, except that the laminated porous film (1-iv) was not immersed in diethyl carbonate. Table 1 shows a rate characteristic of the laminated separator in accordance with Comparative Example 1.

COMPARATIVE EXAMPLE 2

A PVDF-based resin (manufactured by Arkema Inc.; product name "KYNAR2801") was stirred and dissolved in N-methyl-2-pyrrolidone at 65° C. for 30 minutes so that a solid content was 7% by mass. A resultant solution was applied as a coating solution to a polyethylene porous film (thickness 12 μm, porosity 44%, average pore diameter 0.035 μm) through a doctor blade method so that a volume per unit area of the PVDF-based resin in the coating solution was 0.56 cm$^3$/m$^2$. A laminated body (8-i), which was a material thus obtained by applying the coating solution to the polyethylene porous film, was dried at 85° C. for 5 minutes, so that a laminated separator in accordance with Comparative Example 2 for a nonaqueous electrolyte secondary was obtained. Table 1 shows a rate characteristic of the laminated separator in accordance with Comparative Example 2.

<Production of Nonaqueous Electrolyte Secondary Battery>

Next, using the laminated separators in accordance with Examples 1 through 6 and Comparative Examples 1 and 2 which were produced as above, nonaqueous electrolyte secondary batteries were produced as follows.

(Cathode)

A commercially available cathode which was produced by applying LiNi$_{0.5}$Mn$_{0.3}$Co$_{0.2}$O$_2$/conductive material/PVDF (weight ratio 92/5/3) to an aluminum foil was used. The aluminum foil of the cathode was cut so that a portion of the cathode where a cathode active material layer was formed had a size of 40 mm×35 mm and a portion where the cathode active material layer was not formed, with a width of 13 mm, remained around that portion. The cathode active material layer had a thickness of 58 μm and density of 2.50 g/cm$^3$.

(Anode)

A commercially available anode produced by applying graphite/styrene-1,3-butadiene copolymer/carboxymethyl cellulose sodium (weight ratio 98/1/1) to a copper foil was used. The copper foil of the anode was cut so that a portion of the anode where an anode active material layer was formed had a size of 50 mm×40 mm, and a portion where the anode active material layer was not formed, with a width of 13 mm, remained around that portion. The anode active material layer had a thickness of 49 μm and density of 1.40 g/cm³.

(Assembly)

In a laminate pouch, the cathode, the laminated separator, and the anode were laminated (disposed) in this order so as to obtain a nonaqueous electrolyte secondary battery member. In this case, the cathode and the anode were positioned so that a whole of a main surface of the cathode active material layer of the cathode was included in a range of a main surface (overlapped the main surface) of the anode active material layer of the anode.

Subsequently, the nonaqueous electrolyte secondary battery member was put in a bag made by laminating an aluminum layer and a heat seal layer, and 0.25 mL of a nonaqueous electrolyte solution was poured into the bag. The nonaqueous electrolyte solution was an electrolyte solution at 25° C. obtained by dissolving $LiPF_6$ with a concentration of 1.0 mole per liter in a mixed solvent of ethyl methyl carbonate, diethyl carbonate, and ethylene carbonate in a volume ratio of 50:20:30. The bag was heat-sealed while a pressure inside the bag was reduced, so that a nonaqueous electrolyte secondary battery was produced.

<Rate Test>

New nonaqueous electrolyte secondary batteries which had not been subjected to any cycle of charge and discharge were subjected to 4 cycles of initial charge and discharge. Each cycle of the initial charge and discharge was performed under conditions that the temperature was 25° C., the voltage range was 4.1 V to 2.7 V, and the current value was 0.2 C (1C is defined as a value of a current at which a rated capacity based on a discharge capacity at 1 hour rate is discharged for 1 hour. The same is applied hereinafter).

Subsequently, the nonaqueous electrolyte secondary batteries, which had been subjected to the initial charge and discharge, were each subjected to three cycles of charge and discharge at 55° C. The three cycles of the charge and discharge were carried out with respect to a first battery at a constant charge electric current value of 1 C and a constant discharge electric current value of 0.2 C, and the three cycles of the charge and discharge were carried out with respect to a second battery, which is different from the first battery but identical in structure to the first battery, at a constant charge electric current value of 1 C and a constant discharge electric current value of 20 C. Then, a rate characteristic was calculated in accordance with a formula below.

Rate characteristic (%)=(discharge capacity at 20C/ discharge capacity at 0.2C)×100

TABLE 1

|  | Volume per unit area of coating layer [cm³/m²] | Gloss [%] | Piercing strength [N] | Rate characteristic 20 C/0.2 C [%] |
| --- | --- | --- | --- | --- |
| Example 1 | 0.56 | 3.2 | 6.3 | 73 |
| Example 2 | 0.56 | 8.0 | 6.0 | 76 |
| Example 3 | 0.56 | 17.4 | 5.5 | 71 |
| Example 4 | 0.56 | 25.4 | 6.0 | 77 |
| Example 5 | 0.11 | 17.6 | 5.8 | 84 |
| Example 6 | 1.58 | 18.3 | 5.4 | 76 |
| Comparative Example 1 | 0.56 | 2.7 | 5.5 | 65 |
| Comparative Example 2 | 0.56 | 30.4 | 6.5 | 43 |

As shown in Table 1, it was confirmed that, in the nonaqueous electrolyte secondary battery including the laminated separator in accordance with Comparative Example 2, which laminated separator had a 60-degree specular gloss of more than 26%, the rate characteristic was 43%, which was remarkably low. It can be assumed that this is because the porous layer having the 60-degree specular gloss of more than 26% had an excessively high denseness, and ion permeability was accordingly decreased due to (i) an increase in internal resistance of the nonaqueous electrolyte secondary battery and/or (ii) a deterioration in function of retaining an electrolyte solution at an interface between the separator and an electrode.

It was confirmed that, in the nonaqueous electrolyte secondary battery including the laminated separator in accordance with Comparative Example 1, which laminated separator had a 60-degree specular gloss of less than 3%, the rate characteristic was 65%, which was low. It can be assumed that this is because the porous layer having the 60-degree specular gloss of less than 3% had low uniformity, and thus had non-uniform ion permeability.

Meanwhile, it was confirmed that, in the nonaqueous electrolyte secondary battery including the laminated separator in accordance with each of Examples 1 through 6, which laminated separator had a 60-degree specular gloss of 3% to 26%, the rate characteristic was not less than 70% and a battery characteristic was excellent.

The invention claimed is:

1. A method of producing a laminated separator for a nonaqueous electrolyte secondary battery, the laminated separator including (i) a porous film containing a polyolefin-based resin at a proportion of not less than 50% by volume and (ii) a porous layer containing a polyvinylidene fluoride-based resin, the method comprising the steps of:
   (1) applying a coating solution, in which the polyvinylidene fluoride-based resin is dissolved, to the porous film to form a coating layer;
   (2) separating the polyvinylidene fluoride-based resin out of the coating layer; and
   (3) adjusting a gloss of the coating layer from which the polyvinylidene fluoride-based resin has been separated, wherein the gloss is adjusted by a chemical treatment, a physical treatment of removing a surface of the coating layer, a corona treatment, or a plasma treatment.

2. The method as set forth in claim 1, wherein the gloss is adjusted by a chemical treatment utilizing an acid, an alkali, or an organic solvent.

3. The method as set forth in claim 2, wherein the chemical treatment utilizes a ketone, an amide, a cyclic carbonate, a chain carbonate, or a cyclic ester.

4. The method as set forth in claim 3, wherein the chemical treatment utilizes dimethyl carbonate, diethyl carbonate, ethyl methyl carbonate, or a fluorine substituent of any of the dimethyl carbonate, the diethyl carbonate, and the ethyl methyl carbonate.

* * * * *